UNITED STATES PATENT OFFICE.

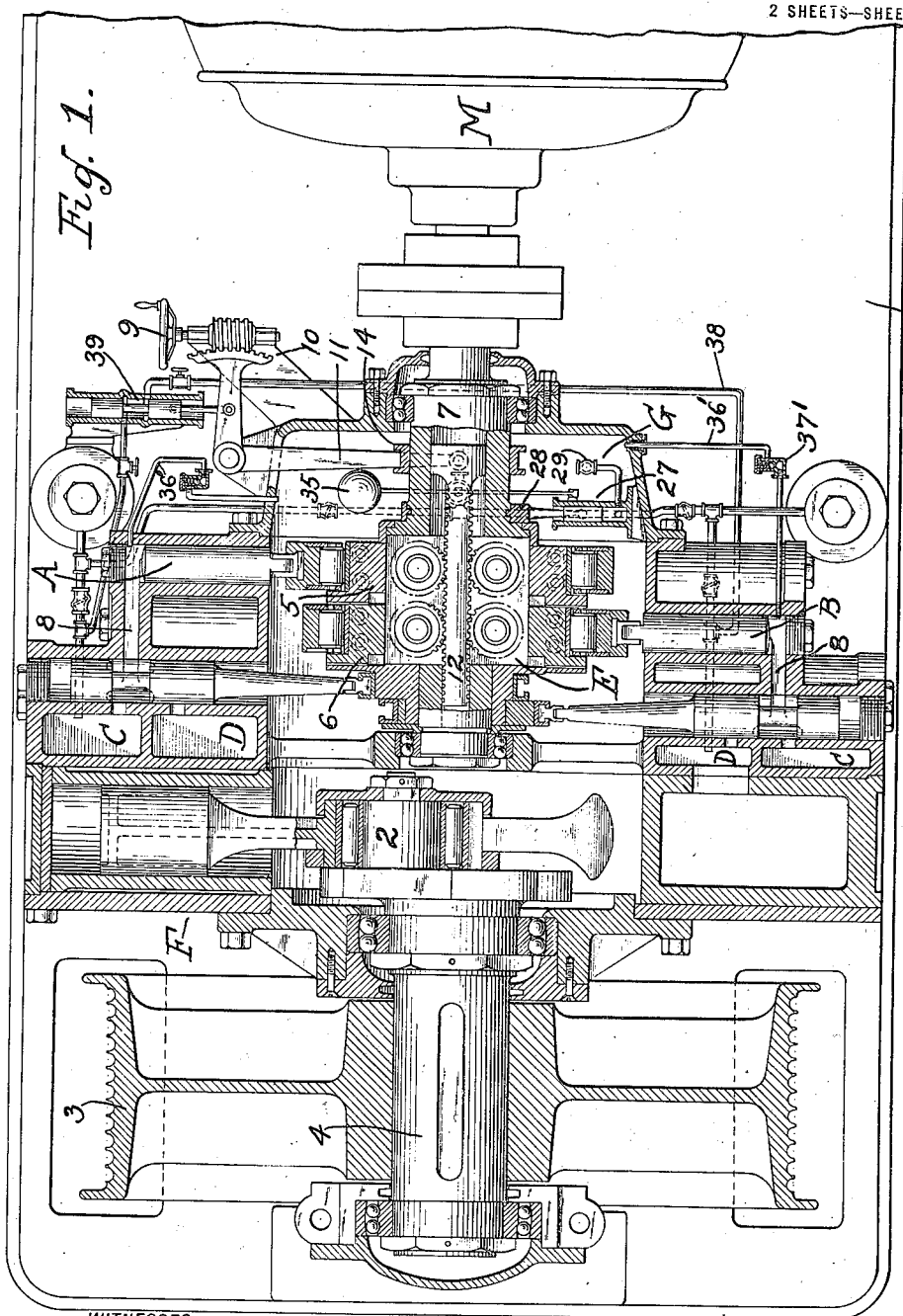

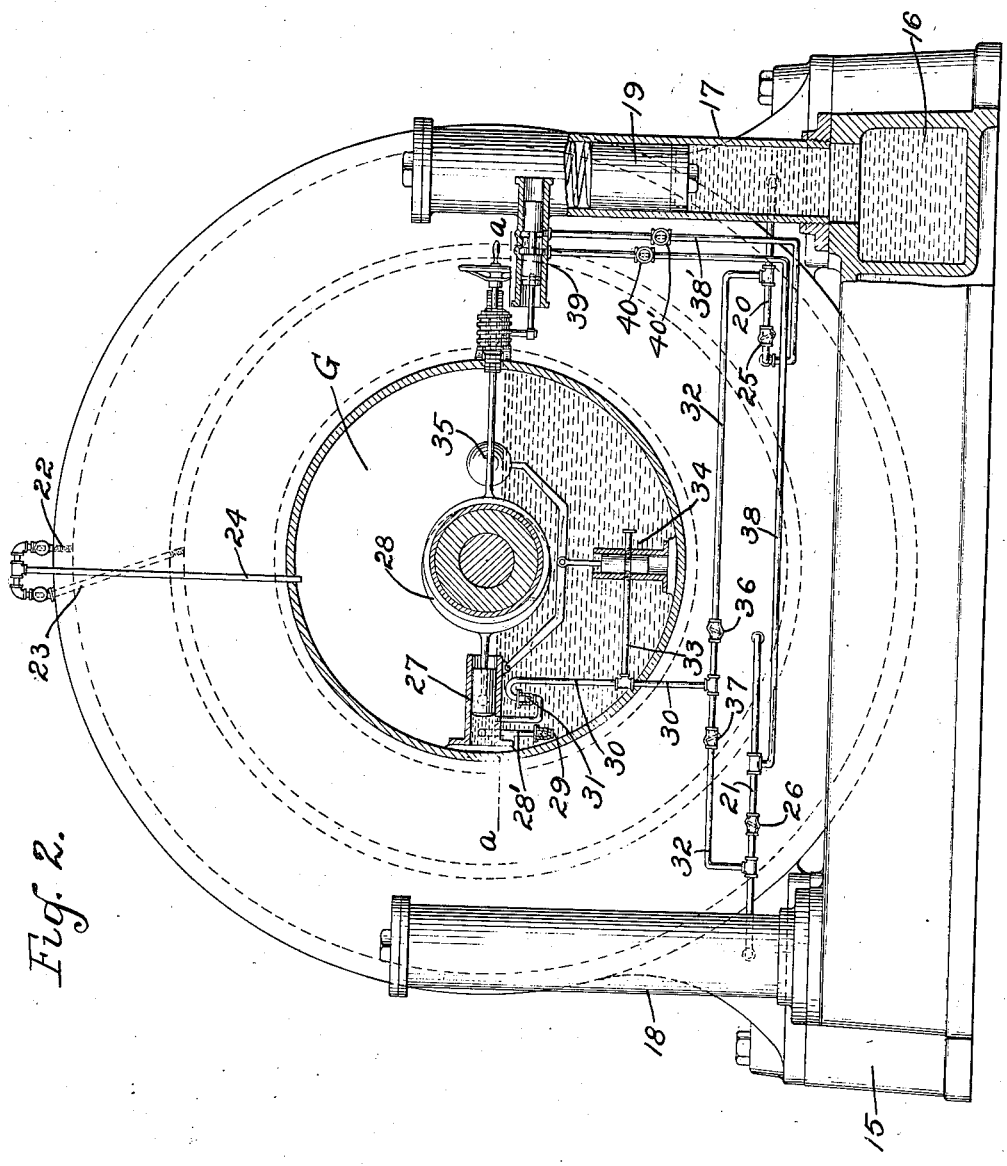

AUGUST SUNDH, OF HASTINGS-UPON-HUDSON, NEW YORK, ASSIGNOR TO OTIS ELEVATOR COMPANY, A CORPORATION OF NEW JERSEY.

HYDRAULIC VARIABLE-SPEED POWER-TRANSMISSION MECHANISM.

1,178,111.  Specification of Letters Patent.  Patented Apr. 4, 1916.

Application filed April 22, 1914. Serial No. 833,583.

*To all whom it may concern:*

Be it known that I, AUGUST SUNDH, a citizen of the United States, residing in Hastings-upon-Hudson, in the county of Westchester and State of New York, have invented a new and useful Improvement in Hydraulic Variable-Speed Power-Transmission Mechanism, of which the following is a specification.

The invention relates to improvements in hydraulic variable speed power transmission mechanism, consisting of a fluid pressure motor, a fluid pressure pump for driving the same, together with controlling mechanism for varying the torque and speed of the fluid motor and for effecting the operation of the same in reverse directions by reversing the direction of fluid thereto.

The invention consists of a novel arrangement for obtaining and maintaining a predetermined or desired amount of fluid pressure in the fluid operating system at all times, irrespective of whether the power mechanism be in operation or idle.

Another object of the invention is to provide means for automatically returning the leakage from the pump and motor to the system and under pressure.

Other objects of the invention will appear more fully hereinafter, the novel combinations and arrangement of parts being pointed out in the appended claims.

Referring now to the drawings, Figure 1 is a sectional plan view, showing hydraulic power transmission mechanism, with the application thereto of my improved accumulator system, etc.; Fig. 2 is an elevational end view of Fig. 1, partly in section.

The particular type of hydraulic power transmission mechanism shown in the drawings is similar to that shown and described in detail in my co-pending application, Serial No. 794,829, filed October 13, 1913, therefore only a brief description of the same will be given herein, which together with a more detailed description of the improved accumulator system will permit of a clear understanding of the invention, and the objects sought to be attained thereby.

The fluid motor F is of a well known type, and comprises a plurality of single acting cylinders whose plungers or pistons are connected to a common crank pin 2. A driven member 3 comprises a cable sheave which is keyed to the crank shaft 4, and is adapted to receive the hoisting cables of an elevator or other hoist, or if desired the sheave 3 may be replaced by a belt pulley, gear or other device, whereby power may be transmitted from the crank shaft to any desired power consuming device.

The pump P comprises two sets of cylinders A and B, each cylinder having its own valve. Each set of cylinders is operatively connected to a different adjustable eccentric, such as 5 and 6, arranged closely side by side on a common shaft 7, and each and every cylinder is radially disposed about the axis of the said shaft. The valves for each cylinder are also radially disposed about the said shaft, and each set of valves is operated by a corresponding eccentric fixed on the shaft 7.

The interconnected chambers C are adapted to receive fluid under pressure, while the interconnected chambers D are utilized to carry off the exhaust from the working cylinders; or when it is desired to reverse the direction of rotation of the motor F, these connections are reversed so that pressure is supplied to the chambers D, while the chambers C are connected to the exhaust.

The mode of operation of the valves in controlling the fluid from the pump ports 8, 8, to the chambers C and D is fully described in the co-pending application heretofore referred to, and since the same forms no particular part of the present invention, a further description thereof is thought not necessary.

The eccentrics 5 and 6 are actuated by means of a center shifting device E to vary the stroke of the pump plungers A and B, and thereby vary the quantity of fluid delivered to the fluid motor F, which latter motor has a torque and speed characteristic which vary in inverse ratio, or in other words, as the speed of the motor F increases, the torque decreases proportionately therewith.

The center shifting device may be controlled automatically, or by means of a hand wheel 9, which through a worm and gear connection 10 actuates a bell crank lever 11, the latter being connected to an actuating member 12 of the center shifting device E through a grooved collar 14 which is slidable on the shaft 7. The shaft is coupled or otherwise operatively connected with any suitable source of operating power such as a gas engine, an electric motor M as is shown, or any of the other well known types of prime movers.

Thus far in the description it will be seen that the speed of the fluid motor F can be varied as desired throughout the entire range thereof from minimum to maximum by varying the output of the pump, which output is varied by varying the stroke of the pump plungers, said variation in the stroke of the pump plungers being effected by varying the eccentricity of the eccentrics which latter are controlled by the hand wheel 9. The operation of the fluid motor F in reverse directions is effected by a reverse operation of the hand wheel 9 and parts connected therewith, from their normal position as now shown, thus effecting a reversal in the direction of flow of the fluid between the pump and the fluid motor F.

The fluid motor, pump and electric motor, are positioned on and suitably secured to a bed plate 15.

The parts comprising the accumulator system and which form the particular subject-matter of the present invention will now be described.

By reference to Fig. 2 it will be noted that chambers 16 are provided in the bed plate 15, these chambers containing liquid such as water or oil, preferably the latter. Accumulators 17 and 18 are provided, each one having contained therein a spring pressed piston 19, which keeps the fluid contained in the chamber 16 under constant pressure at all times. Pipes 20 and 21 connect the accumulators 17 and 18 with the chambers C and D, respectively. With this connection thus provided between the accumulators and the chambers C and D, a uniform and elastic pressure is maintained at all times in the latter chambers, and likewise in the pump cylinders. The provision of such uniform pressure in the pump and motor cylinders is of great practical value, since it absolutely prevents the formation of a vacuum, regardless of the speed, and thus the device as a whole is enabled to operate at a high speed with full power and great efficiency, while the usual shocks and jars due to water hammer are entirely eliminated. Furthermore the fluid in the chambers C and D being confined and under pressure, reduces the confinement of air in the fluid to a minimum, and in order to relieve whatever small amount should remain therein, I provide relief valves in the pipes 22 and 23, said pipes being connected to the chambers C and D at the highest points thereon, and with a pipe 24 common to both, said pipe 24 discharging into the chamber G in the pump casing.

I provide check valves 25 and 26 in the pipes 20 and 21, respectively, to prevent a return of fluid from the chambers C and D if the pressure in one or the other of the latter should be higher than that in the accumulators, but permitting a free passage of fluid from the accumulators to the said chambers if the pressure in either of the latter is lower than that in the accumulators.

Now it is a well known fact that in transmission mechanism of the character herein described, there is always a certain amount of leakage, and I propose to provide means to return this leakage to the system under pressure, said means comprising the following: An auxiliary pump 27 is arranged to be driven by an eccentric 28 on the shaft 7. This pump it is to be understood can be driven by some other source of independent power, the arrangement herein shown being simply for the sake of convenience. An intake pipe 28' for the pump is provided with a ball valve 29, and a pipe 30 having a ball valve 31 connects with a pipe 32 which is common to the pipes 20 and 21. A pipe 33 connects with the pipe 30 and opens by way of a by-pass valve 34 into the chamber G. The casing G is provided with liquid up to a level $a$—$a$, which I will term the normal level. This fluid is provided to the point as indicated, so that the intake of the pump 27 is always below the fluid. A float 35 controls the by-pass valve 34, and when the fluid is at normal level as indicated, and the pump 27 operated, fluid is simply circulated from the chamber G, through the pump, and by-pass valve back into the chamber G. Thus it will be seen the float 35 controls the valve 34 in a manner to absolutely prevent the fluid dropping below the normal level, thus preventing the sucking of air in with the fluid. Now as before stated, there is always more or less leakage from the system, which leakage of course lowers the pressure in the system. With the arrangement as shown in Fig. 2, this leakage is accumulated in the chamber G, thus causing the float to rise and close the by-pass valve 34. With the by-pass valve closed, the pump 27 will now deliver fluid to the accumulators 18 and 19 by way of pipes 30, 32, 20 and 21, and when the fluid in the chamber G again reaches its normal level the valve 34 simply by-passes the fluid from the pump into the chamber G again, thus only the exact amount of leakage is returned to the system. It will be noted here that the fluid thus pumped from the chamber G, will serve to equalize the pressure in the accumulators 18 and 19. Check valves 36 and 37 are provided in the pipe 32 to prevent the backing up of fluid from the accumulators to the pump. It will be here noted that with the provision of the spring pressed pistons in the accumulators, the pump 27 will never have to work against more than normal pressure, which will depend on the strength of the springs associated with the pistons.

It will now be seen that the leakage is automatically returned to the system under pressure, and since each of the chambers C and D is provided with an independent accumulator, the latter will therefore act independently to maintain a uniform and elastic pressure in their associated chambers at all times, irrespective of the direction of fluid working in said chambers.

Associated with each of the pump cylinders are pipes 36', which communicate with the ports 8 and the chamber G in the pump casing, each one of said pipes having a ball check valve 37' therein. The connection thus provided permits of a discharge of any air from the ports 8 which might be sucked therein by the pump pistons.

In various types of apparatus employing hydraulic variable speed power transmission mechanism, the load in certain instances will tend to drive the fluid motor, as for example, in the case of an automobile going down a grade, or in certain classes of hoisting apparatus, when the power drives the hoist in one direction, and the load drives the same in the opposite direction. In this instance that is where the tendency of the load is to drive the motor, the pump pistons will be in a no stroke position, this resulting in a fluid lock, which of course prevents the reciprocation of the motor pistons due to the driving action thereon by the load. In order now to permit the reciprocation of the motor pistons and to overcome the fluid lock, I provide a system for by-passing the fluid around the chambers C and D, the system comprising pipes 38 and 38' connected through a by-pass valve 39. The pipes 38 and 38' are tapped onto the pipes 21 and 20, respectively, or may be otherwise connected, the arrangement being such that when the pump pistons are at no stroke position the pipes 38, 38' by way of the valve 39 will permit the circulation of liquid between the chambers C and D. In the drawings the pipes 38 and 38' are shown as having substantially the same carrying capacities, whereas as a matter of fact in actual practice the pipes employed to by-pass the fluid around the chambers C and D will have a somewhat greater carrying capacity than those of the accumulator system.

It will be seen that the valve 39 is operatively connected with the mechanism controlling the eccentrics, and as the hand wheel 9 is rotated in one direction or the other, the valve 39 gradually checks the flow of fluid around the chambers C and D, thus effecting a braking action on the fluid motor, which degree of braking action can be regulated as desired by the hand wheel 9. When so desired the by-pass between the chambers C and D can be made ineffective by means of plug valves 40, 40'.

Although I show the invention applied to a particular form of variable speed hydraulic power transmission mechanism, it is to be understood that the same has a general application to all the various well known types of hydraulic variable speed transmission mechanism now in common use; I wish therefore not to be limited in the application of the invention to the particular type of mechanism herein disclosed.

What I claim is:—

1. In fluid pressure power transmission mechanism, the combination of a fluid motor adapted to run in both directions by fluid pressure directed thereto from a pressure pump, fluid chambers connecting with the motor and pump, said chambers being adapted alternately to receive fluid pressure and discharge, a fluid pressure system for automatically maintaining a predetermined pressure in the said chambers when receiving the discharge, means for maintaining said system at a uniform predetermined pressure, and means comprising a valve controlled by a float for automatically regulating the first named means.

2. In combination with fluid pressure power transmission mechanism, means for accumulating the leakage from said mechanism, an auxiliary pump operatively connected with said mechanism for returning said leakage to the fluid operating system of said transmission mechanism, and a regulating device for directing the fluid to said mechanism in proportion to the amount of said leakage.

3. In combination with fluid pressure power transmission mechanism, means for accumulating the leakage from said mechanism, an auxiliary pump for returning said leakage to the fluid operating system of said mechanism, and means comprising a float actuated valve for directing fluid to the system in proportion to the amount of leakage.

4. In combination with fluid pressure power transmission mechanism, means for accumulating leakage from said mechanism, an auxiliary pump for returning said leakage to the fluid operating system of said mechanism, a float actuated valve for directing fluid to said system in proportion to the leakage, and for by-passing fluid around the auxiliary pump when the approximate amount of leakage is returned to the said system.

5. In combination with variable speed fluid power transmission mechanism, a chamber associated with said mechanism, said chamber being adapted to receive the leakage from said mechanism and containing fluid to a predetermined level, a pump for returning the leakage to the fluid system of the transmission mechanism, said pump having its suction below said predetermined level, and means to prevent lowering of the fluid in said chamber below said predetermined level.

6. In combination with variable speed fluid power transmission mechanism, a chamber associated with said mechanism, said chamber being adapted to receive leakage from said mechanism and containing fluid to a predetermined level, a pump for returning the leakage to the fluid system of the power transmission mechanism, said pump having its suction below said predetermined level, and a float actuated valve for effecting a delivery of fluid by the pump to the said fluid system when the fluid in said chamber rises above said predetermined level, and for by-passing fluid around the pump when the fluid attains said predetermined level.

In testimony whereof I have signed my name to this specification in the presence of two subscribing witnesses.

AUGUST SUNDH.

Witnesses:
JAMES G. BETHELL,
WALTER C. STRANG.